US012475156B2

(12) United States Patent
Machado et al.

(10) Patent No.: US 12,475,156 B2
(45) Date of Patent: Nov. 18, 2025

(54) COMMUNICATION PLATFORM FOR A CONNECTED ENVIRONMENT

(71) Applicant: DevRev, Inc., Palo Alto, CA (US)

(72) Inventors: Michael Machado, Burlingame, CA (US); Parikshit Deshmukh, Pune (IN); Rabi Shanker Guha, Bengaluru (IN); Anshu Avinash, Bengaluru (IN)

(73) Assignee: DevRev, Inc., Palo Alto, CA (US)

(*) Notice: Subject to any disclaimer, the term of this patent is extended or adjusted under 35 U.S.C. 154(b) by 0 days.

(21) Appl. No.: 18/634,585

(22) Filed: Apr. 12, 2024

(65) Prior Publication Data
US 2025/0322002 A1    Oct. 16, 2025

(51) Int. Cl.
G06F 16/30      (2019.01)
G06F 16/335     (2019.01)
G06F 16/9032    (2019.01)

(52) U.S. Cl.
CPC ...... *G06F 16/335* (2019.01); *G06F 16/90332* (2019.01)

(58) Field of Classification Search
CPC ................. G06F 16/90332; G06F 16/335
See application file for complete search history.

(56) References Cited

U.S. PATENT DOCUMENTS

| 11,971,914 B1* | 4/2024 | Watson | G06F 16/3347 |
|---|---|---|---|
| 2010/0145976 A1* | 6/2010 | Higgins | G06F 16/3322 |
| | | | 707/E17.069 |
| 2015/0339405 A1* | 11/2015 | Vora | G06F 16/24578 |
| | | | 707/723 |
| 2020/0401590 A1* | 12/2020 | Staar | G06F 16/24522 |
| 2022/0414170 A1* | 12/2022 | Helvik | G06F 16/9535 |
| 2023/0394045 A1* | 12/2023 | Nixon | G06F 16/248 |
| 2024/0020538 A1* | 1/2024 | Socher | G06F 16/90332 |
| 2024/0184834 A1* | 6/2024 | McCann | G06F 16/9532 |

FOREIGN PATENT DOCUMENTS

CN       117708292 A *  3/2024

OTHER PUBLICATIONS

Machine Translation of CN 117708292A by Dong et al., (Filed on Dec. 13, 2023, Published on Mar. 15, 2024).*
Dunn, M., et al., "SearchQA: A New Q&A Dataset Augmented with Context from a Search Engine," dated Jun. 11, 2017.
Liu, L., et al., "Query Expansion Using Contextual Clue Sampling with Language Models," dated Oct. 13, 2022.
Li, D., et al., "Generation-Augmented Query Expansion For Code Retrieval," dated Dec. 20, 2022.

(Continued)

*Primary Examiner* — Mahesh H Dwivedi
(74) *Attorney, Agent, or Firm* — Vista IP Law Group, LLP

(57) ABSTRACT

Techniques are disclosed to generate relevant responses for requests received in a connected environment. A user communicating with the connected environment may request, in natural language, an operation to be performed. The request may be augmented with the information related to the requesting user to generate an augmented query. The augmented query may be processed by a large language model to generate a response to the augmented query. The response is returned in natural language.

15 Claims, 4 Drawing Sheets

(56) References Cited

OTHER PUBLICATIONS

Wang, H., et al., "BlendFilter: Advancing Retrieval-Augmented Large Language Models via Query Generation Blending and Knowledge Filtering," dated Oct. 15, 2024.
Ghali, J., et al., "Enhancing Retrieval Processes for Language Generation with Augmented Queries," Procedia Computer Science, vol. 231, dated Feb. 2024.
Qiu, Y., et al., "Concept Based Query Expansion," SIGIR '93: Proceedings of the 16th annual international ACM SIGIR conference on Research and development in information retrieval, dated Jul. 1, 1993.
Mitra, M., et al., "Improving Automatic Query Expansion," SIGIR '98: Proceedings of the 21st annual international ACM SIGIR conference on Research and development in information retrieval, dated Aug. 1, 1998.
Guu, K., "Realm: Retrieval-Augmented Language Model Pre-Training," ICML'20: Proceedings of the 37th International Conference on Machine Learning Article No. 368, pp. 3929-3938, dated Jul. 13, 2020.
Warren, D., et al., "An Efficient Easily Adaptable System for Interpreting Natural Language Queries," American Journal of Computational Liguistics, vol. 8, No. 304, dated Jul. 1982.
Kaufmann, E., Talking to the Semantic Web—Natural Language Query Interfaces for Casual End-users, Doctoral Thesis for the Degree of a Doctor in Informatics at the Faculty of Economics, Business Administration and Information Technology of the University of Zurich, dated Feb. 2009.
Ram, O., et al., "In-Context Retrieval-Augmented Language Models," Transactions of the Association for Computational Linguistics, vol. 11, pp. 1316-1331, dated Mar. 2023.

\* cited by examiner

COMMUNICATION PLATFORM FOR A CONNECTED ENVIRONMENT

BACKGROUND

Products and services are deployed in a connected environment having numerous users that communicate with each other. The users communicating in the connected environment may range from developers of a product or service to end-users of the deployed product and services. For example, a connected environment for an organization that develops a software product may inhabit a development ecosystem and a user ecosystem. The development ecosystem has a set of development tools and databases that are organized and optimized for the software development process. Further, the user ecosystem may include a set of computing systems, machines, or server devices configured for efficiently executing the deployed software product as a part of the connected environment. The connected environment may further inhabit an administrator ecosystem of the software product including a set of computing systems responsible for operations or monitoring to administer the software product. Additionally, the connected environment may also inhabit customer relationship personnel responsible for communicating with end-users (customers) (e.g., using CRM systems, billing systems, etc.) in relation to maintaining sales and/or customer relationships.

BRIEF DESCRIPTION OF FIGURES

The drawings illustrate the design and utility of various embodiments of the invention. It should be noted that the figures are not drawn to scale and that elements of similar structures or functions are represented by reference numerals throughout the figures. In order to better appreciate how to obtain the above-recited and other advantages and objects of various embodiments of the invention, a detailed description of the present subject matter will be rendered by reference to specific embodiments thereof, which are illustrated in the accompanying drawings. Understanding that these drawings depict only typical embodiments of the invention and are not therefore to be considered limiting of its scope, the present subject matter will be described and explained with additional specificity and detail through the use of the accompanying drawings.

DETAILED DESCRIPTION

Figure 1:
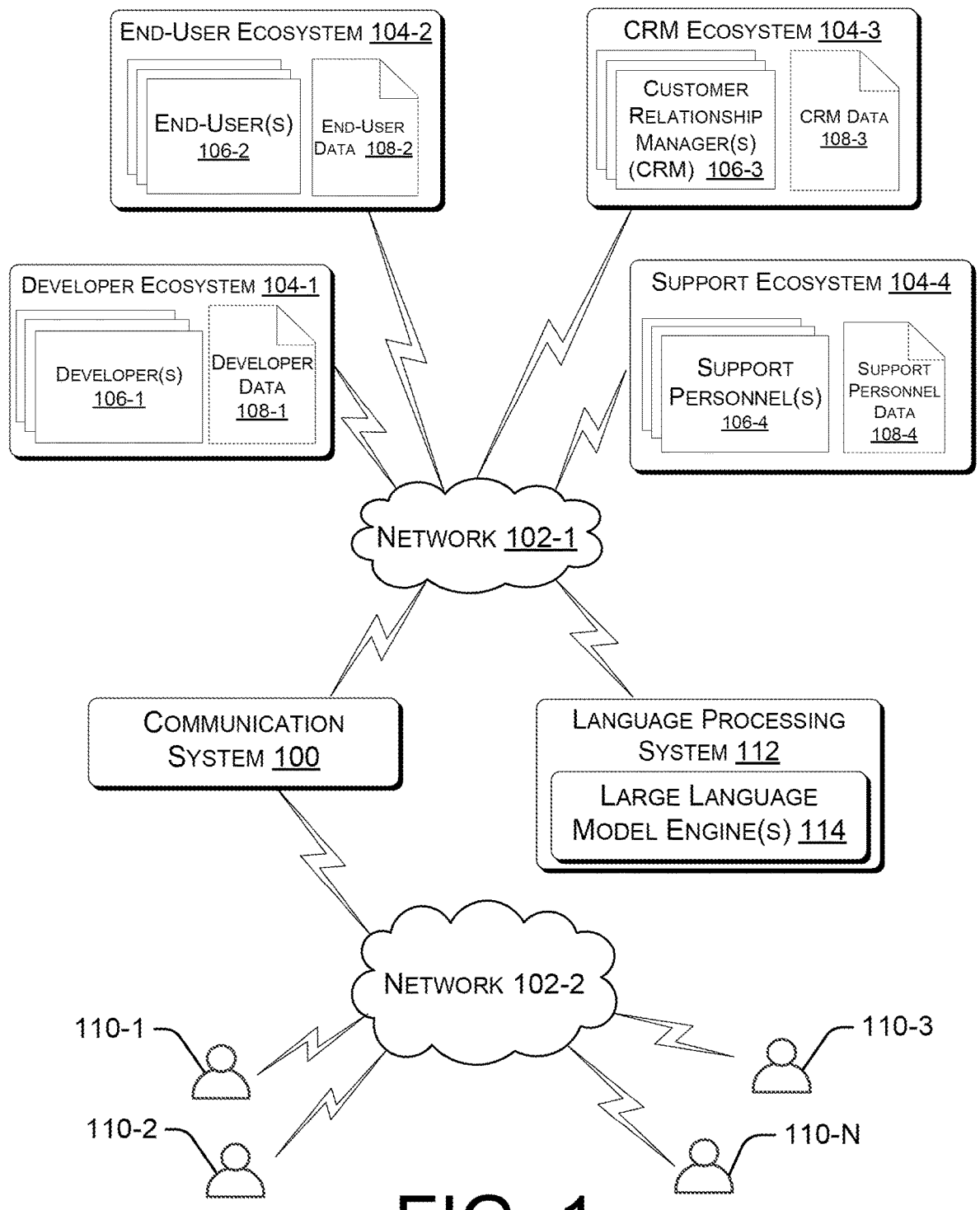
FIG. 1 provides an illustration of a connected environment implementing a communication system, in accordance with an example implementation of the present subject matter.

Enterprise applications provide software as a service (SaaS) that integrates multiple operations of an enterprise within a single platform. The multiple operations include different functions of an enterprise, such as product development, product lifecycle management, customer support, and customer relationship management, among others, that may be implemented within a connected environment facilitated by the enterprise applications. The multiple operations are performed by users having different areas of expertise and different requirements of the enterprise applications. Each user may communicate with the connected environment, via a single platform, by entering queries and receiving results to their queries.

Participants of the connected environment, such as developers and end users may communicate with the platform by providing sophisticated queries and instructions to perform desired operations within the connected environment. Such sophisticated queries and instructions may be feasibly generated by developers possessing due expertise in Structured Query Language (SQL) and ability of constructing complex data warehouse queries. Further, end-users who possess knowledge about query structures and language may easily access and communicate within the connected environment. However, providing sophisticated queries may become a bottleneck for end-users having limited experience with the platform provided by the enterprise applications and limited proficiency of programming domains. As a result, the users unable to create sophisticated queries may not be able to feasibly communicate with the platform and access the resources of the enterprise applications.

Certain enterprise applications provide a platform allowing users to enter keywords for a particular object to be searched within the connected environment. The object may correspond to one or more data block stored within a storage location from amongst multiple storage locations in different ecosystems inhabiting the connected environment. The keywords are matched with available objects within the multiple storage locations in the connected environment, and matching results are returned. However, for communicating with such keyword-matching platforms, the users should provide the exact keyword for the desired object to be retrieved. In some scenarios, keyword-matching algorithms of the platform may generate vast number of results, a majority of which will be irrelevant to the user initiating the search. Therefore, the users will have to further filter the search on a multitude of factors to obtain the relevant results. Since the connected environment inhabits vast number of ecosystems together, identifying the exact object that is needed by a user for a particular operation in the connected environment is complex and cumbersome. The complexities in communicating with the connected environment may impede user experience and efficiency, and therefore merely due to the impeded communication with the platform, the capabilities of the enterprise applications go unutilized.

The present subject matter provides a communication system to access a connected environment inhabiting various ecosystems, such as a developer ecosystem, user ecosystem, administrator ecosystem, Customer Relationship Personnel ecosystem and the like. The communication system may provide a front-end interface that may be launched from any point of access within the connected environment. For example, a user may trigger a search on the front-end interface from any location within the connected environment. The location may, for example, range from any integrated development environment (IDE) in a developer ecosystem, a particular page on the deployed product or service, or a support page in the connected environment. The front-end interface enables a seamless, dialog-based communication between the user and the enterprise application using Application Programming Interfaces (APIs). The user may communicate via the front-end interface to onboard with the enterprise application, query the enterprise application, obtain notification communication, perform analytics, and the like.

The communication system allows the user to request, in natural language, an operation to be performed in the connected environment. The request may be received for any operation or action to be performed in the connected environment. The communication system may further obtain information associated with the requestor, hereinafter referred to as requestor information, and augment the information with the request received in natural language. The requestor information may be obtained from a system of record(s) associated with the user in the connected environment. The requestor information may include, in an example, user's persona, work domain, browsing history of the user, current location of the user within the connected environment, action history of the user, jobs currently pending with the user, and the like, which are helpful in determining the intent of the user behind the request. The interactions of the user within the connected environment from a point of admission in the connected environment to the current location of the user within the connected environment may be recorded as a navigation trail of the user. The point of admission may be any location from where the user begins interacting with the connected environment. Further, each user communicating with the connected environment may be provided with a unique identifier that may be used to obtain an identification information of the user, for example, an information of an ecosystem to which the user belongs, work domain of the user, jobs currently pending with the user, and the like.

The communication system augments the request received in natural language with the requestor information to generate an augmented query. The requestor information may include information including, but not limited to, the identification information of the requestor and the navigation trail of the user within the connected environment. The requestor information for each user is generated on-the-fly during the period when the requestor is browsing through the connected environment. In one example, the communication system may derive the identification information based on user information stored in a user-related data store against the unique identifier associated with the user.

The communication system may input the augmented query to a large language model. Augmenting the requestor information allows the communication system to identify the intent of the user behind the request and thus, generate more accurate and relevant results for requests received from the user.

For complex operations, the system can generate workflow graphs with executable objects, which are sets of machine-readable instructions that perform the requested operation in a structured and efficient manner. The generation of workflow graphs and executable objects to perform requested operations provides a structured approach to executing complex tasks within the connected environment. In an example, the augmented query may be provided as an input to the large language model using chain-of-thought prompting. In another example, the augmented query may be provided as an input to the large language model using few-shot prompting. Since chain-of-thought prompting and/ or few shot prompting techniques provide inputs to the large language models, the complex reasoning on the augmented query is performed in intermediate steps, thereby, providing improved results on the augmented queries.

The augmented queries may be processed by the large language model to generate a response. In an example, the large language model may generate a workflow graph comprising set of objects that may be executed to perform the operation requested by the user in the connected environment. The set of objects may be referred to as executable objects. Each executable object may include a set of machine-readable instructions which may be executed to perform intermediary steps required to generate the response. The output from execution of each executable object may be fed as input to a subsequent object. In an example, the workflow graph may be generated by the large language model using cognitive and generative Artificial Intelligence techniques.

Once all objects of the workflow graph have been executed successfully, a response is generated against the request by the user. The response is a result of the operation requested by the user and may be rendered to the user in a natural language format.

The communication system avoids hardcoding of the large language model algorithms and semantical information by generating on-the-fly augmentation for requests received as a natural language input at the front-end interface. Therefore, the communication system allows dynamic generation of query results that varies based on multiple factors associated with the user who has input the query. Accordingly, a single request would yield different results when raised by different users.

In an example, a developer "A" in the connected environment may input a request stating, "Show pending tickets". The request will be augmented with contextual information associated with the developer creating the request. The contextual information related to the developer may include the developer's identification number and the feature of a product that the developer is currently working upon, for example feature x of product y. Therefore, the request will be augmented with the developer's identity to recite "Show tickets associated with feature x of product y pending with A". Similarly, another request with the same keyword "Show pending tickets" received from a support personnel will yield different results, as the contextual information varies with the entities generating the requests. Therefore, results of high relevance are obtained for requests raised by users in the connected environment.

Further, the communication system allows a user to modify the response generated by the large language model. In an example implementation, the communication system may display, in natural language, the augmented query and the response for the augmented query generated by the large language model. The communication system may generate a prompt to the user for confirmation to execute the response to perform the operation requested by the user. In case the user identifies that the response is not what the user intended, the user may request certain modifications to the response. In other words, in case the response is not satisfactory, the user may manually modify the response. A log of the modification may be stored in a System of Records (SoR) repository associated with the user in the connected environment. The large language models may be retrained using the logs of manual modifications stored in the SoR repositories to generate more efficient results for future queries. The communication system is thus constantly tuned for dynamically improving the query results and communication within the enterprise applications.

In an example, to execute the response, the communication system may generate a workflow graph including one or more objects to be executed in order to perform the operation. The one or more objects may be referred to as executable objects. A flow sequence is determined for executing the executable objects to perform the operation and accordingly a sequence number is assigned to each object in the workflow graph. Each executable object is executed individually or in parallel to execution of other executable objects in order to perform the requested operation in the connected environment.

The communication system enables users to effortlessly query the enterprise application, obtain relevant answers, and dynamically adapt with the interface to facilitate data visualization, record manipulation, and guided workflows, thereby revolutionizing communications with the enterprise applications. The front-end interface, responses to the augmented queries, and workflows generated by the communication system may be tailored constantly to provide a more individualized user experience, improving user engagement and overall satisfaction of the user with the enterprise application. Further, by eliminating the need for SQL skills or constructing complex data warehouse queries, the communication system lowers the entry barrier for users with limited technical proficiency. This broadens the user base of the enterprise application and increases user adoption rates.

The natural language-based communication platform eases navigating through workflows or make inquiries since the users are not required to be versed with programming languages to generate sophisticated queries. This results in a more seamless user experience, lessening the burden on less technology-proficient departments such as customer support, sales, and customer relationship management. Additionally, the use of a large language model to interpret and execute operations can reduce the likelihood of errors that might occur with manual query formulation or execution of complex operations. Further, the collection and analysis of user interactions and modifications can provide valuable insights into user behavior and preferences, which can inform further development and optimization of the system and the connected environment.

Further, since the front-end interface may be triggered from any location in the connected environment, providing relevant responses is feasible. Allowing the front-end interface to be triggered from any location in the connected environment can improve efficiency and productivity as users can get real-time, contextual answers without navigating away from their current workflow. The ability to be launched from various points within the connected environment suggests that the communication system can be integrated with existing systems and workflows, enhancing the value of current IT investments. Further, by improving the user experience and efficiency, the communication system can help organizations to fully harness the potential of their enterprise application, thereby increasing the return on investment.

The present subject matter is further described with reference to FIGS. 1-4. It should be noted that the description and figures merely illustrate principles of the present subject matter. Various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 provides an illustration of a connected environment implementing a communication system, in accordance with an example implementation of the present subject matter. The communication system 100 may either be a standalone computing system or a combination of multiple computing devices operating together in a distributed computing environment. In an example, the communication system 100, among other functions, may facilitate communications between multiple users.

In an example implementation, the communication system 100 may be connected, through a network 102-1, to distinct ecosystems 104-1, 104-2, . . . 104-N operating in a connected environment. In an example, the communication system 100 may be internal to the connected environment and thus may be owned and controlled by an owner of the connected environment. In another example, the communication system 100 may be external to the connected environment.

The distinct ecosystems 104-1, 104-2, . . . 104-N may be inhabited by personnel operating within the connected environment in relation to a deployed product of an enterprise application. For ease of reference, the distinct ecosystems 104-1, 104-2, . . . 104-N may be hereinafter referred to individually as distinct ecosystem 104 and collectively as distinct ecosystems 104. The distinct ecosystems may be categorized pertaining to the different functions related to the enterprise application. The distinct ecosystems may include at least one of a developer ecosystem 104-1, end-user ecosystem 104-2, Customer Relationship Management (CRM) ecosystem 104-3, and operation ecosystem 104-4. Each ecosystem may be inhabited by personnel realizing the functions of the ecosystem. For example, the developer ecosystem 104-1 may be inhabited by developers 106-1, the end-user ecosystem 104-2 may be inhabited by end-users 106-2, the CRM ecosystem 104-3 may be inhabited by a customer relationship managers 106-3, and the operation ecosystem 104-4 may be inhabited by support personnels 106-4. The information related to each person inhabiting the distinct ecosystems 104 may be stored in one or more data stores (not shown) in each of the distinct ecosystems 104. The information related to developers 106-1 may be stored as developer data 108-1, the information related to end-users 106-2 may be stored as end-user data 108-2, the information related to customer relationship managers 106-3 may be stored as customer relationship managers data 108-3, and the information related to support personnels 106-4 may be stored as support data 108-4.

The communication system 100 may further be connected to one or more external users 110-1, 110-2, 110-3, . . . 110-N, through a network 102-2. The one or more external users 110-1, 110-2, 110-3, . . . 110-N may be hereinafter collectively referred to as external users 110 and individually referred to as external user 110. The external users 110 may be users willing to onboard onto the connected environment. The developers 106-1, end-users 106-2, customer relationship managers 106-3, support personnels 106-4, and the external users 110 may collectively be referred to as users. The users may connect with the communication system 100 via computing devices. The computing devices may include, but are not limited to, smartphones, laptops, desktops, televisions, personal digital assistants (PDAs), and IoT-enabled devices.

In an example implementation, the network 102-1 and network 102-2 may collectively be referred to as networks 102 may be a wireless or a wired network, or a combination thereof. The networks 102 can be a collection of individual networks, interconnected with each other and functioning as a single large network. Examples of such individual networks include, but are not limited to, Global System for Mobile communication (GSM) network, Universal Mobile Telecommunications System (UMTS) network, Long Term Evolution (LTE) network, personal communications service (PCS) network, Time-division multiple access (TDMA)

network, Code-Division Multiple Access (CDMA) network, next-generation network (NGN), public switched telephone network (PSTN), and Integrated Services Digital Network (ISDN). Depending on the technology, the networks 102 includes various network entities, such as transceivers, gateways and routers, however, such details have been omitted to maintain the brevity of the description. In an example, the networks 102 may include any communication network that uses any of the commonly used protocols, for example, Hypertext Transfer Protocol (HTTP), and Transmission Control Protocol/Internet Protocol (TCP/IP).

In an example implementation, the communication system 100 may host one or more computer-implemented services that users can interact using their respective computing device(s), referred to as client device(s) (not shown). The computer-implemented services may be hosted with a server device of the connected environment to implement operations within the connected environment. The connected environment may host cloud-based service(s) for lifecycle management of a product in relation to which the connected environment is implemented. Such a connected environment may host, for example, node-to-node and/or peer-to-peer communication through, for example, a cloud platform application programming interface (API). In an example implementation, the cloud-based service(s) hosted by the connected environment may be deployed using virtual machine(s) on respective computing device(s) of the users.

In an example, the communication system 100 may be implemented a web application. In another example, the communication system 100 may be provided as a web plugin(s) that may be integrated within a web application owned by the connected environment. The communication system 100 may be executed to provide a front-end interface on a client device through which a user (inclusive of, but not limited to, developers 106-1, end-users 106-2, customer relationship managers 106-3, support personnels 106-4, and the external users 110) may be able to communicate within the connected environment. The launch of the front-end interface may be triggered by the users from any location within the connected environment. The location may for example, range from any integrated development environment (IDE) in a developer ecosystem, a particular page on the deployed product or service, or a support page in the connected environment. The front-end interface may be launched by triggering a widget on a webpage being displayed for a currently executing cloud-based service of the connected environment.

The users may send requests to the communication system 100 via the front-end interface. The requests may be in the form of, but not limited to, text, audio, image, video, and the like. In an example, the users may send requests in natural language to the communication system 100 and therefore may not concern themselves with the creating queries in structural query language which often requires knowledge of programming constructs supported by the communication system 100.

The communication system 100 may identify the user sending the request as a requestor. The information related to the requestor may be augmented with the request received from the requestor. In case, the requestor is one of the inhabitants of the connected environment, for instance, one of developers 106-1, end-users 106-2, customer relationship managers 106-3, and support personnel 106-4, the information related to the requestor may be extracted from the one or more data store(s) of the connected environment. For example, when the requestor is a developer 106-1, the developer data 108-1 may be augmented with the request. Further, when the requestor is an end-user 106-2, the end-user data 108-2 may be augmented with the request. Furthermore, when the requestor is a customer relationship manager 106-3, the request may be augmented with customer relationship data 108-3. Additionally, when the requestor is a support personnel 106-4, the request may be augmented with support data 108-4.

In an example, when the requestor is an external user 110, the user information may be entered manually by the external user upon being prompted to enter information at the front-end interface of the communication system 100. The user information for the external user 110 may also be obtained autonomously after being granted access to personal data, such as cookie information, browsing history, and the like. The information related to the requestor that is augmented with the request is referred to as requestor information.

In an example, the communication system 100 may include one or more data capturing tools implemented to capture items from the distinct ecosystems 104 operating in the connected environment using any suitable mechanism or technique. For example, the data capturing tools may include connectors, rover(s), and/or Application Programming Interfaces (APIs). In an example, the connectors may be used with respect to a log of CRUD ("create, read, update, delete") operations performed by the requestor within the connected environment. The rover(s) may be used to implement pure collection activities in a single direction from the requestors. For example, the rover(s) may collect logs, alerts, jobs, and usage data related to the requestor. The APIs may be used to implement programmatic access to the requestors and pull data related to the requestor. In another example, the requestor information may be received by pulling the appropriate JavaScript or HTML pertinent to a given request.

The data generated by the requestor during their term of habitat in the connected environment may be used as requestor information to be augmented with the received request. In one example implementation, rover(s) and connector(s) may be implemented to capture data regarding events, incidents, tickets, and issues are stored as part of an object data store related to the requestor. In an example the front-end interface may include one or more cache components (e.g., memory, SSDs) to cache data related to the requestor, The caching process is useful, for instance, to efficiently interact with data without necessarily going back to a distinct ecosystem 104 which was the source of that data, for each subsequent interaction of the requestor with the communication system 100.

The received request augmented with the requestor information may be referred to as an augmented query. The requestor information includes identification information of the requestor. The identification information may be a unique identifier indicative of the profile of the requestor and the distinct ecosystem 104 to which the requestor belongs. In an example, the unique identifier may be used to query the data store(s) of the distinct ecosystem 104 to obtain information relevant to the requestor. In one example, each event conducted by a user in the connected environment, may be recorded and stored against the unique identifier associated with the user. The unique identifier may include, but not limited thereto, a username, an email address, a device identifier (MAC address, a serial number, and the like). In some example implementations, the unique identifier may be used in combination with a credential (for example, a personal identification number (PIN), a keyword, an answer to a challenge question, and the like).

The requestor information may also include a navigation trail of the requestor within the connected environment. The navigation trail may include information related to a sequence of interactions of the requestor within the connected environment. The sequence of interactions may comprise information related to modules accessed or modified by the requestor in the connected environment. The navigation trail of the requestor may be stored in the data store(s) of distinct ecosystem 104 to which the requestor belongs. The navigation trail may be stored in form of a linked list linked in order of modules accessed before reaching the current location in the connected environment from where the launch of the front-end interface of the communication system 100 is triggered.

The communication system 100 may further be communicatively coupled to a language processing system 112. In an example, the language processing system 112 may be accessible to the communication system 100 through a network 102-1. In another example, the language processing system 112 may be integrated with the communication system 100. The language processing system 112 may include natural language processing module(s) that may process the augmented query to generate machine-readable instructions to perform an operation that was requested in the received request.

The natural language processing module(s) may include a large language model that may be executed by a large language model engine 114 of the language processing system 112. Large language model(s) may utilize deep learning techniques to interpret the augmented query received as an input. The augmented query is a combination of the request received in natural language and the requestor information. The large language model(s) may be configured to process the augmented query to generate an output of the augmented query in machine readable instruction format. The machine-readable instructions may be directed to perform the operation indicated in the request received in natural language.

In addition, the large language model(s) may implement a computer-implemented service, such as a chatbot, that may be rendered on the front-end interface launched on the computing device of the users of the communication system. Upon processing the augmented query, the chatbot may render a response in natural language format to the requestor. The response may be an indication of the large language model(s) interpretation of the operation requested by the requestor. In an example, the large language model(s) may generate the output of the operation in natural language using inbuilt neural networks.

The communication system 100 may receive and execute the machine-readable instructions to perform the operation indicated in the request received. Further, the communication system 100 may render the result of the operation on the front-end interface. Further details related to the implementation of the communication system 100 are provided with reference to FIG. 2.

Figure 2:
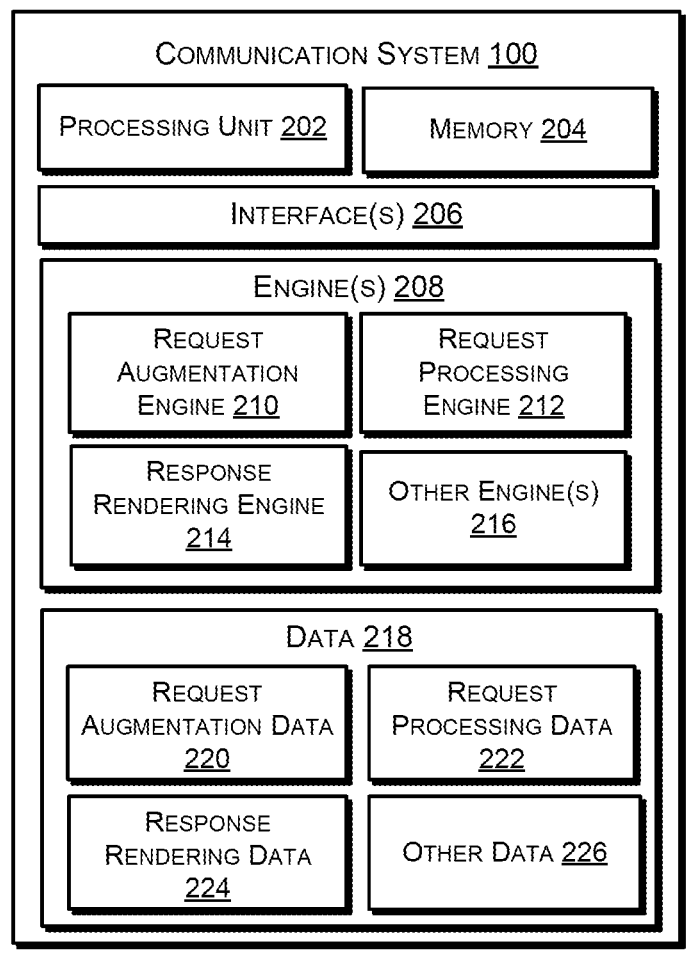
FIG. 2 illustrates schematics of the communication system, in accordance with an example of the present subject matter.

FIG. 2 illustrates schematics of the communication system 100, in accordance with an example of the present subject matter. In an example, the communication system 100 may be communicably coupled to users of the discrete ecosystems 104 (shown in FIG. 1). In another example, the communication system 100 may be communicably coupled to external users 110 (shown in FIG. 1).

The communication system 100 may include a processing unit 202 and a memory 204 coupled to the processing unit 202. The processing unit 202, amongst other capabilities, may be configured to fetch and execute computer-readable instructions stored in a memory, for example in the memory 204. The processing unit 202 may be implemented as one or more microprocessors, microcomputers, microcontrollers, digital signal processors, central processing units, state machines, logic circuitries, and/or any devices that manipulate signals based on operational instructions. The functions of the various elements shown in the figure, including any functional blocks labelled as "processing unit", may be provided through the use of dedicated hardware as well as hardware capable of executing machine readable instructions.

The functions of the various elements shown in FIG. 2, including any functional blocks labelled as "processing unit", may be provided through the use of dedicated hardware as well as hardware capable of executing instructions. When provided by a processor, the functions may be provided by a single dedicated processor, by a single shared processor, or by a plurality of individual processors, some of which may be shared. Moreover, explicit use of the term "processing unit" would not be construed to refer exclusively to hardware capable of executing instructions, and may implicitly include, without limitation, digital signal processor (DSP) hardware, network processor, application specific integrated circuit (ASIC), field programmable gate array (FPGA), read only memory (ROM) for storing instructions, random access memory (RAM), non-volatile storage. Other hardware, conventional and/or custom, may also be included.

The memory 204 may be coupled to the processing unit 202 and may, among other capabilities, provide data and instructions for generating different requests. The memory can include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

The communication system 100 may also include interface(s) 206. The interface(s) 206 may include a variety of machine-readable instructions-based interfaces and hardware interfaces that allow the communication system 100 to interact with different entities, such as the processing unit 202, the memory 202, engine(s) 208, and data 218. Further, the interface(s) 206 may enable the communication system 100 to communicate with computing devices, for example, the computing devices through which the developers 106-1, end-users 106-2, customer relationship manager(s) 106-3, support personnel(s) 106-4, other users of the distinct ecosystems 104, external users 110 communicate with the communication system 100. Further, the interface(s) 206 may enable the communication system 100 to exchange information with web servers, and external repositories. Additionally, the communication system 100 is communicably coupled with other server(s), for example, the language processing system 112 (depicted in FIG. 1) may be enabled by different interface(s) 206. The interface(s) 206 may facilitate multiple communications within a wide variety of networks and protocol types, including wireless networks, wireless Local Area Network (WLAN), RAN, satellite-based network, and the like.

The communication system 100 may further include the engines 208, where the engine(s) 208 may include a request augmentation engine 210, request processing engine 212 coupled to the request augmentation engine 210, response rendering engine 214 coupled to the request processing engine 212, and other engine(s) 216. In an example, the engines 208 may be implemented as a combination of hardware and firmware or software. In examples described herein, such combinations of hardware and firmware may be implemented in several different ways. For example, the firmware for the engine may be processor executable instructions stored on a non-transitory machine-readable storage medium and the hardware for the engine may include a processing resource (for example, implemented as either a single processor or a combination of multiple processors), to execute such instructions.

In the present examples, the machine-readable storage medium may store instructions that, when executed by the processing resource, implement the functionalities of the engine. In such examples, the communication system 100 may include the machine-readable storage medium storing the instructions and the processing resource to execute the instructions. In other examples of the present subject matter, the machine-readable storage medium may be located at a different location but accessible to the communication system 100 and the processing unit 202.

The communication system 100 may further include the data 218, that serves, amongst other things, as a repository for storing data that may be fetched, processed, received, or generated by the request augmentation engine 210, request processing engine 212, response rendering engine 214, and the other engine(s) 216. In an example, the data 218 may include request augmentation data 220, request processing data 222, response rendering data 224, and other data 318. In an example, the data 218 may be stored in the memory 204.

In one example implementation, the communication system 100 may receive a request to onboard with a connected environment from one or more external users, for example, external users 110 (shown in FIG. 1) via the interface(s) 206. The request may be received in natural language. As discussed above, the connected environment may inhabit multiple discrete ecosystems operating independently in relation to a deployed product of an enterprise application. The one or more external users may input information such as the information on the ecosystem they wish to operate in, personal information, among others. The one or more external users may input the information, via interface devices, connected with a computing device(s) at the external user's end.

The interface(s) may be communicably coupled with the engine(s) 208 and may provide the received request and information to the request augmentation engine 210. The request augmentation engine 210 receives the request and augments the received request with information related to the requestor, which in the present example implementation, is the external user, such as the external user 110 (shown in FIG. 1) willing to onboard with the connected environment. The received request augmented with the information related to the requestor is stored as an augmented query in the data repository storing request augmentation data 220.

In another example implementation, a user from one of the distinct ecosystems operating in the connected environment may request an operation to be performed via the interface(s) 206. The request may be received in a natural language. As discussed above, the interface(s) 206 may be communicably coupled with the engine(s) 208 and may provide the received request to the request augmentation engine 210. The request augmentation engine 210 further requests information related to the requestor from one or more data store(s) implemented in relation to the requestor in the distinct ecosystem to which the requestor belongs. The requestor, in the present example implementation, is the user operating in a distinct ecosystem in the connected environment which sends a request.

The request augmentation engine 210 sends a request to a system of records, via the interface(s) 206, to provide requestor information. The system of records may be stored in the data store(s) hosted in the ecosystem of the connected environment to which the requestor belongs. In an example, the requestor information may include, in an example, user's persona, work domain, the browsing history of the user within the connected environment, the navigation trail of the user within the connected environment, current location of the user within the connected environment, action history of the user, jobs currently pending with the user, and the like.

The request to provide requestor information sent by the request augmentation engine 210 may include requestor identification information. The request augmentation engine 210 may receive the requestor identification information. In an example, the requestor identification information may be encapsulated along with the request to perform the operation received by the request augmentation engine 210. In another example, the requestor may establish a session with the communication system 100 before sending requests. The session may be established by transmission of identification information from the requestor to the communication system 100. The communication system 100 may store the received identification information as the other data 226 stored in memory 204. In an example, the identification information may be stored in a cache memory of the communication system 100. Therefore, the communication system 100 may be aware of the identification information associated with the requestor.

The request augmentation engine 210 may query the data store(s) of the connected environment against the identification information associated with the requestor to access the system of record(s) stored for the requestor. The request augmentation engine 210 obtains the requestor information from the system of record(s) and stores it as request augmentation data 220. The requestor information may be inclusive of, but not limited to, a navigation trail of the requestor within the connected environment. The navigation trail may be generated by identifying the current location of the user within the connected environment and browsing history of the user within the modules of the connected environment. The navigation trail may be indicative of how the user has navigated within the connected environment to reach the current location. In other words, the navigation trail of the requestor in the connected environment is indicative of a sequence of interactions of the requestor within the connected environment. For example, the navigation trail may indicate a microservice(s) currently being accessed by the requestor for the product. The navigation trail may further indicate the pending tickets that the requestor has worked with before reaching the currently accessed microservice(s). The request augmentation engine(s) 210 augments the requestor information inclusive of, but not limited to, the navigation trail and the requestor identification information to the received request to perform the operation in the connected environment. The request to perform the operation in the connected environment when augmented with the requestor information forms an augmented query.

The request augmentation engine 210 transmits the augmented query to the request processing engine 212. In an example implementation, the request processing engine 212 has in-built natural language processing module(s). In an example, the in-built natural language processing module(s)

may include a large language model. In another example, the request processing engine 212 may communicate with a large language model hosted by a third-party language processing system. The large language model may interpret the augmented query to determine the operation indicated in the request received in natural language in view of the requestor information. The large language model may translate the augmented query received in natural language into a machine-readable code. In an example, the large language model may further use generative artificial intelligence techniques to generate a response for the requested operation.

For example, if a user from the end-user ecosystem 104-2 (depicted in FIG. 1) sends a request to the front-end interface launched by the connected system 100. The request may indicate "Generate release notes". The request may be sent from the front-end interface, such as interface 206, to the request augmentation engine 210. The request augmentation engine 210 may identify the requestor from the requestor identification information as an end-user, such as the end-user 106-2 belonging to the end-user ecosystem 104-2. Further, the request augmentation engine 210 may obtain the requestor information, inclusive of but not limited to navigation trail of the requesting end-user, from the end-user data 108-2. The navigation trail is indicative of a sequence of interactions of the requestor within the connected environment. For example, the navigation trail may indicate the current module of the product deployed in the connected environment that the requestor is working with. In the given example, the end-user may be viewing a particular enhancement E1 of the product and has reached the particular enhancement through a particular version V1 of the product. The navigation trail of the user from the product to a particular version of the product to a particular enhancement in the particular version of the product may be augmented with the request indicating "Generate release notes".

Therefore, the request augmentation engine 210 may generate an augmented query to "Generate release notes for enhancement E1 in version V1 of the product". The request augmentation engine 210 may send the augmented query to the request processing engine 212. The request processing engine 212 may translate the augmented query into machine-readable instructions. The machine-readable instructions may be parsed with a generative artificial intelligence model to generate release notes as requested by the requestor as a response to the query. The response may be stored as request processing data 222.

The request processing engine 212 may transmit the response to a response rendering engine 214. The response rendering engine 214 may implement a chatbot to render the response on the front-end interface launched by communication system 100. In an example, the chatbot may obtain the augmented query from request augmentation data 220 and render the augmented query, as natural language text, on the front-end interface. Further, the chatbot may obtain the response stored as the request processing data 222 and render the same at the front-end interface.

In an example implementation, the requestor may view the augmented query rendered as natural language text on the front-end interface. In case the requestor believes that the augmented query is not what the requestor intended to request, the requestor may input modifications to the augmented query. A record of the modifications may be stored in the memory of the communication system 100 as other data 226.

The other engine(s) 216 may include, among others, a large language model tuning engine. The large language model training engine may, at regular intervals, obtain the record of modifications. The record of modifications may be used to dynamically tune the large language model to enhance the accuracy of predictions.

Figure 3:
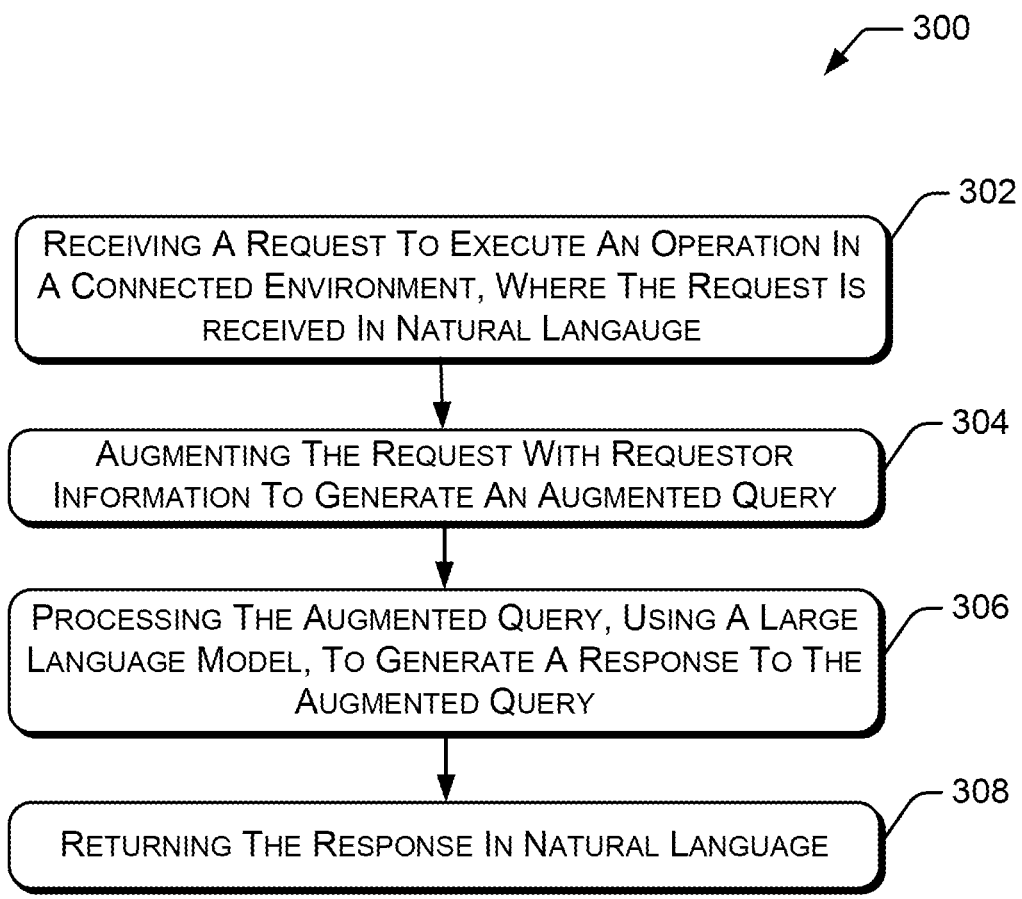
FIG. 3 provides an illustration of a method for communicating in a connected environment in accordance with examples of the present subject matter.

FIG. 3 provides an illustration of a method for communicating in a connected environment in accordance with examples of the present subject matter. The order in which the method is described is not intended to be construed as a limitation, and any number of the described method blocks may be combined in any order to implement the methods, or an alternative method. Further, the method 300 may be implemented by processing resource or computing device(s) through any suitable hardware, non-transitory machine-readable instructions, or combination thereof.

It may also be understood that method 300 may be performed by programmed computing device, such as the communication system 100, as depicted in FIG. 1 and FIG. 2. Furthermore, the method 300 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. The method 300 is described below with reference to the communication system 100, as described above; other suitable systems for the execution of these methods may also be utilized. Additionally, implementation of the method is not limited to such examples.

In FIG. 3, at block 302, a request is received to execute an operation in a connected environment. The request is received in natural language. In an example, the request may be received from an external user 110. The external user 110 may send the request to onboard with the connected environment. In another example, the request may be received from a user operating in the connected environment, from the plurality of users 106, inclusive of but not limited to, developer 106-1, end-user 106-2, customer relationship manager 106-3, and support personnel 106-4. The plurality of users 106 and the external users 110 sending request may be hereinafter referred to as a requestor, for ease of reference. The request may be received in natural language. The requestor is thus liberated from the burden of forming structured queries in order to perform a requisite operation in the connected environment.

At block 304, the request is augmented with requestor information to generate an augmented query. In an example, the requestor information is input manually by the requestor. In another example, the requestor information may be obtained from one or more data store(s) hosted in the connected environment in relation to the requestor. The requestor information may include, in an example, user's persona, work domain, the browsing history of the user within the connected environment, current location of the user within the connected environment, action history of the user, jobs currently pending with the user, and the like which are helpful in determining the intent of the user behind the request. The requestor information may further include a record of movement of the requestor within the connected environment from a point of admission in the connected environment to the current location of the user within the connected environment. The point of admission may be any location from where the user begins interacting with the connected environment. The record of movement may be stored as a navigation trail of the requestor in the one or more data store(s) hosted in the connected environment. The navigation trail of the requestor in the connected environment is indicative of a sequence of interactions of the requestor within the connected environment. Further, each requestor may be provided with a unique identifier that may be used to obtain identification information of the requestor, for example, information of an ecosystem to which the requestor belongs, the work domain of the requestor, jobs currently pending with the requestor, and the like.

At block 306, the augmented query is processed using a large language model to generate a response to the augmented query. In an example implementation, the large language model may interpret the augmented query generated by supplementing the request received in natural language with requestor information. The large language model may translate the augmented query into machine-readable instructions. The machine-readable instructions, when executed, perform the operation requested in the received request. In another example implementation, the large language model may utilize generative artificial intelligence model(s) to generate a response of the augmented query. The generative artificial intelligence model(s) may in an example be transformer-based models that may use machine learning algorithms, statistical analysis, and deep learning techniques to generate the response.

At step 308, the response is returned in natural language. In an example implementation, the response is rendered on a front-end interface through which the request was received. In an example, the response is rendered on the front-end interface by a chatbot. In an example, the response may be displayed in natural language format. In another example, the response may be displayed in a format desired by the requestor.

Figure 4:
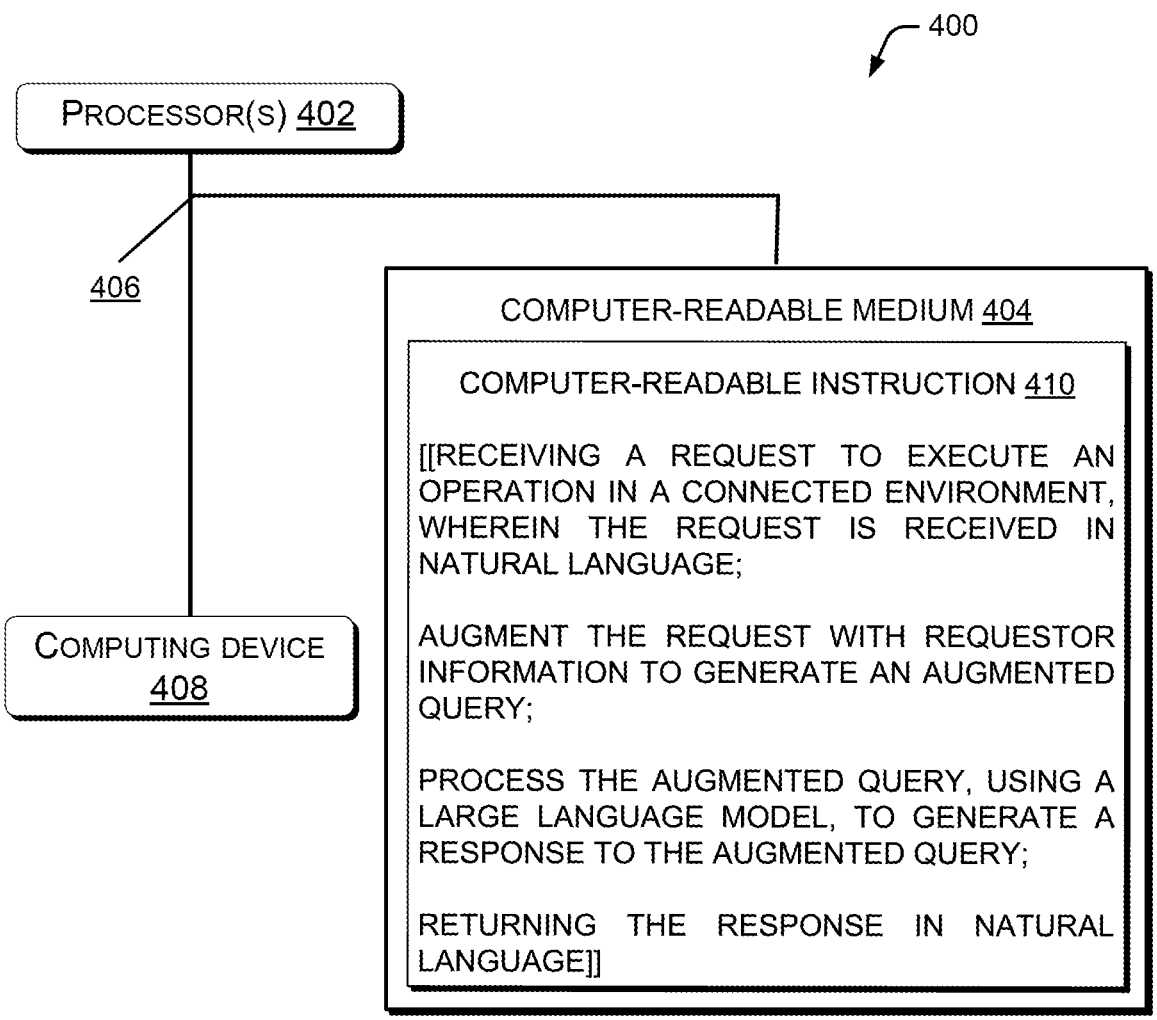
FIG. 4 illustrates a non-transitory computer-readable medium for facilitating communication in a connected environment, in accordance with an example of the present subject matter.

FIG. 4 illustrates a non-transitory computer-readable medium for facilitating performing of communication in a connected environment, in accordance with an example of the present subject matter.

In an example, the computing environment 400 includes a processor 402 communicatively coupled to a non-transitory computer readable medium 404 through communication link 406. In an example implementation, the computing environment 400 may be for example, the communication system 100. In an example, the processor 402 may have one or more processing resources for fetching and executing computer-readable instructions from the non-transitory computer readable medium 404. The processor 402 and the non-transitory computer readable medium 404 may be implemented, for example, in the communication system 100.

The non-transitory computer readable medium 404 may be, for example, an internal memory device or an external memory. In an example implementation, the communication link 406 may be a network communication link, or other communication links, such as a PCI (Peripheral component interconnect) Express, USB-C (Universal Serial Bus Type-C) interfaces, I²C (Inter-Integrated Circuit) interfaces, etc. In an example implementation, the non-transitory computer readable medium 404 includes a set of computer readable instructions 410 which may be accessed by the processor 402 through the communication link 406 and subsequently executed for facilitating communication in the connected environment. The processor(s) 402 and the non-transitory computer readable medium 404 may also be communicatively coupled to a computing device 408 over the network.

Referring to FIG. 4, in an example, the non-transitory computer readable medium 404 includes computer readable instructions 410 that cause the processor 402 to receive a request to execute an operation in a connected environment. The request is received in natural language.

The instructions 410 may further cause the processor 402 to augment the request with requestor information to generate an augmented query. Further, the instructions 410 may cause the processor 402 to process the augmented query, using a large language model, to generate a response to the augmented query. The instructions 410 may cause the processor 402 to return a response in natural language.

Although examples of the present subject matter have been described in language specific to methods and/or structural features, it is to be understood that the present subject matter is not limited to the specific methods or features described. Rather, the methods and specific features are disclosed and explained as examples of the present subject matter.

In the foregoing specification, the present subject matter has been described with reference to specific embodiments thereof. It will, however, be evident that various modifications and changes may be made thereto without departing from the broader spirit and scope of the present subject matter. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A system to facilitate communication within a connected environment having a plurality of distinct ecosystems comprising:
    a processor; and
    a memory coupled to the processor, wherein the processor is to:
    receive a request to execute an operation in the connected environment, wherein the request is received in natural language;
    augment the request with a requestor information to generate an augmented query, wherein the requestor information comprises of:
    an identification information of a requestor providing the request, and
    a navigation trail of the requestor in the connected environment, wherein the navigation trail is indicative of a sequence of interactions of the requestor within the connected environment;
    process the augmented query, using a large language model, to generate a response to the augmented query, wherein the response is a result of the requested operation executed as the augmented query by having the processor:
        generate a workflow graph including one or more executable objects required to execute the operation, wherein an executable object is a set of instructions in machine-readable language to execute the augmented query;
        determine a flow sequence to execute the one or more executable objects;
        assign a sequence number to each of the one or more executable objects in the workflow graph based on the flow sequence; and
        execute the one or more executable objects in accordance with the sequence number;
    return the response in the natural language.

2. The system of claim 1, wherein the request is received at a front-end interface triggerable from a location in the connected environment.

3. The system of claim 1, wherein the identification information includes a user identifier and information related to an ecosystem in which the user operates within the connected environment.

4. The system of claim 3, wherein the plurality of distinct ecosystems include at least one of a developer ecosystem, an end-user ecosystem, an operations ecosystem, and a customer relationship management (CRM) ecosystem.

5. The system of claim 1, wherein the processor is to:
receive a modification to the response;
store a record of the modification in a system of records repository; and
train the large language model using the record of the modification stored in the system of records repository.

6. A method for facilitating communication within a connected environment having a plurality of ecosystems comprising:
receiving a request to execute an operation in the connected environment, wherein the request is received in natural language;
augmenting the request with requestor information to generate an augmented query, wherein the requestor information comprises of:
an identification information of a user providing the request, and
a navigation trail of the requestor in the connected environment, wherein the navigation trail is indicative of a sequence of interactions of the requestor within the connected environment;
processing the augmented query, using a large language model, to generate a response to the augmented query, wherein the response is a result of the requested operation executed as the augmented query, by:
generating a workflow graph including one or more executable objects required to execute the operation, wherein an executable object is a set of instructions in machine-readable language to execute the augmented query; and
determining a flow sequence to execute the one or more executable objects;
assigning a sequence number to each of the one or more executable objects in the workflow graph based on the flow sequence; and
executing the one or more executable objects in accordance with the sequence number;
return the response in natural language.

7. The method of claim 6, wherein the request is received at a front-end interface triggerable from any location in the connected environment.

8. The method of claim 6, wherein the identification information includes a user identifier and information related to an ecosystem in which the user operates within the connected environment.

9. The method of claim 8, wherein the plurality of distinct ecosystems include at least one of a developer ecosystem, an end-user ecosystem, an operations ecosystem, and a customer relationship management (CRM) ecosystem.

10. The method of claim 6, further comprising:
receiving a modification to the response;
storing a record of the modification in a system of records repository; and
training the large language model using the record of the modification stored in the system of records repository.

11. A non-transitory computer-accessible storage medium storing program comprising instructions for facilitating communication within a connected environment having a plurality of distinct ecosystems, the instructions being executable by a processor to:
receive a request to execute an operation in the connected environment, wherein the request is received in natural language;
augment the request with requestor information to generate an augmented query, wherein the requestor information comprises of:
an identification information of a user providing the request, and
a navigation trail of the requestor in the connected environment, wherein the navigation trail is indicative of a sequence of interactions of the requestor within the connected environment;
process the augmented query, using a large language model, to generate a response to the augmented query, wherein the response is a result of the requested operation executed as the augmented query, wherein the instructions are executable by the processor to:
generate a workflow graph including one or more executable objects required to execute the operation, wherein an executable object is a set of instructions in machine-readable language to execute the augmented query; and
determine a flow sequence to execute the one or more executable objects;
assign a sequence number to each of the one or more executable objects in the workflow graph based on the flow sequence; and
execute the one or more executable objects in accordance with the sequence number;
return the response in natural language.

12. The non-transitory computer-accessible storage medium of claim 11, wherein the request is received at a front-end interface triggerable from any location in the connected environment.

13. The non-transitory computer-accessible storage medium of claim 11, wherein the identification information includes a user identifier and information related to an ecosystem in which the user operates within the connected environment.

14. The non-transitory computer-accessible storage medium of claim 13, wherein the plurality of distinct ecosystems include at least one of a developer ecosystem, an end-user ecosystem, an operations ecosystem, and a customer relationship management (CRM) ecosystem.

15. The non-transitory computer-accessible storage medium of claim 11, the instructions being executable by the processor to:
receive a modification to the response;
store a record of the modification in a system of records repository; and
train the large language model using the record of the modification stored in the system of records repository.

* * * * *